W. S. HARLEY.
MOTOR CYCLE FRAME.
APPLICATION FILED SEPT. 19, 1917.

1,266,589.

Patented May 21, 1918.
3 SHEETS—SHEET 1.

Witness:

Inventor:
William S Harley
By Geo W Young
Attorney

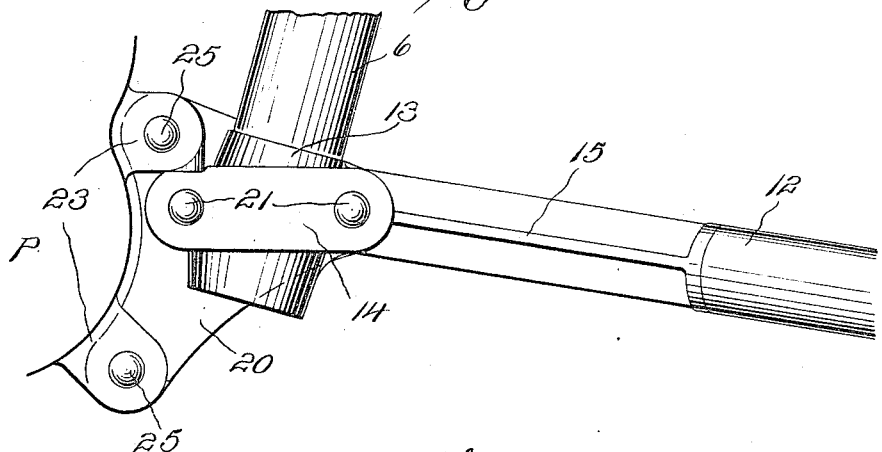
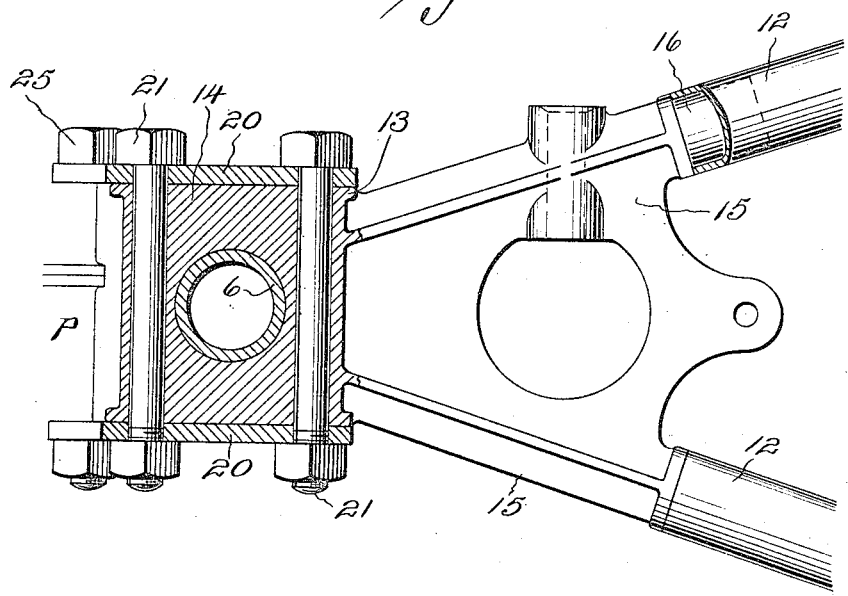

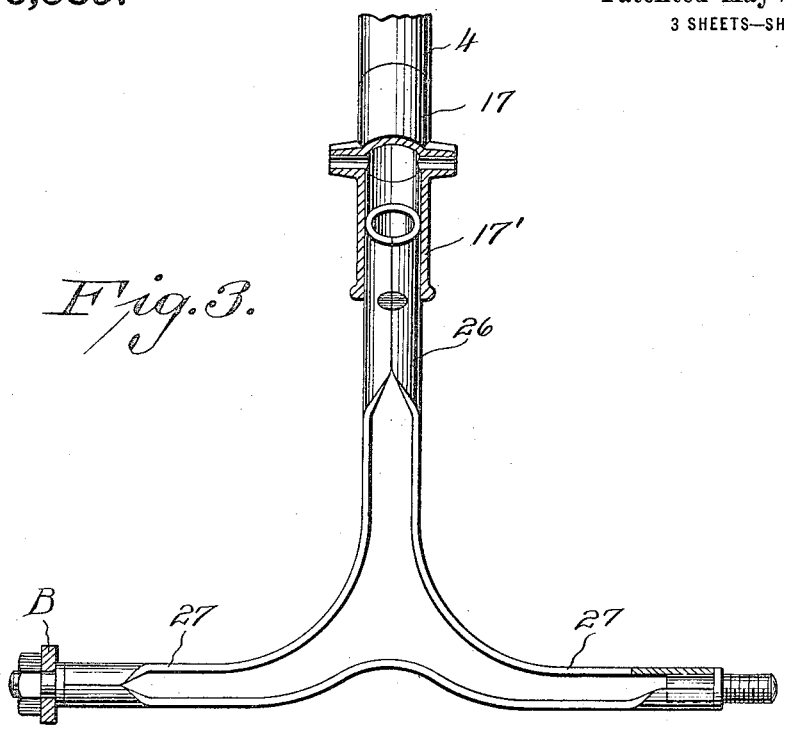
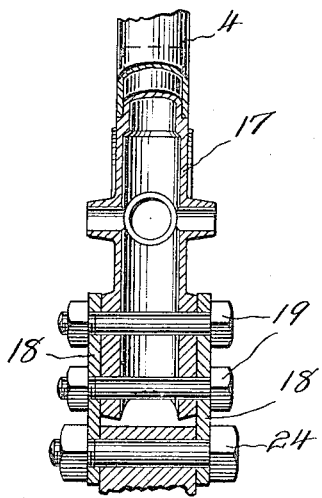
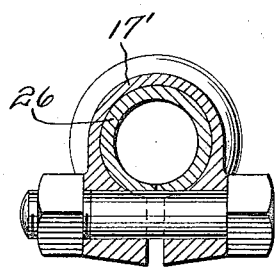

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

MOTOR-CYCLE FRAME.

1,266,589.  Specification of Letters Patent.  Patented May 21, 1918.

Application filed September 19, 1917. Serial No. 192,114.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Motor-Cycle Frames; and I do hereby declare that the following is a full, clear, and exact description thereof.

My invention refers to vehicle frames, such as bicycles, motorcycles, or the like, the same being especially adapted to be used in connection with the latter.

In endeavoring to build a comparatively light motorcycle of sufficient strength of parts to stand more or less rough usage, I have found that a frame constructed in accordance with the present invention will act as a most efficient foundation for the remaining parts of which a motorcycle is formed.

In working out the idea or object in view of providing such a machine as above set forth, it has been found expedient to hang the power plant in the lower part of the frame in a new and novel manner.

One of the several other objects of the present invention is to provide a simply constructed frame, the parts of which are so arranged that all the elements of a motorcycle, which are attached thereto, may be supported in a very compact and efficient manner.

The invention relates to the novel arrangement of parts, which will be hereinafter more particularly described and claimed, and shown in the drawings, wherein:—

Fig. 2 is a horizontal sectional view taken substantially on the plane of the line 2—2 of Fig. 1.

Figure 1:
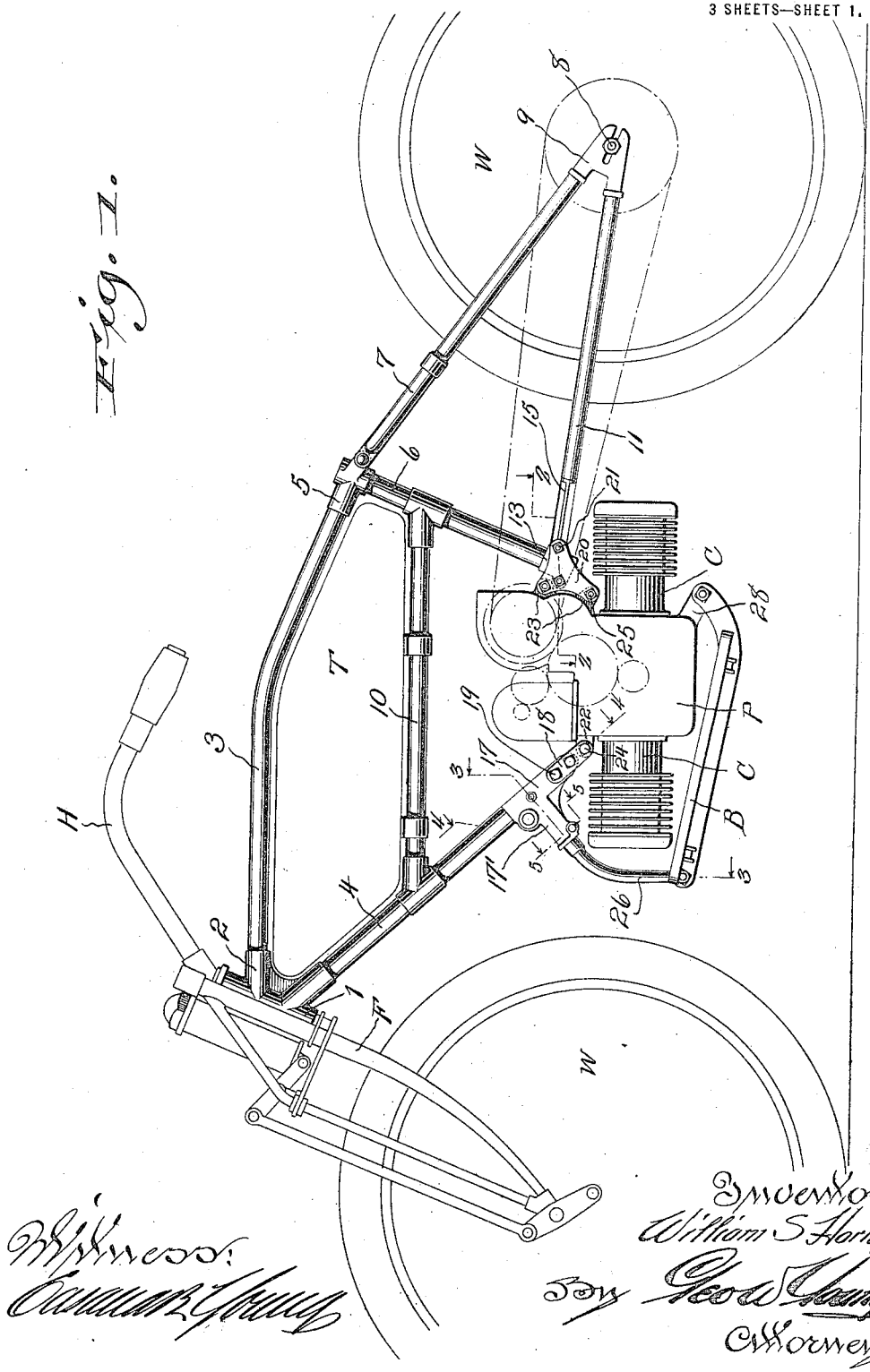
Figure 1 is a side elevational view of a portion of a motorcycle, the novel parts thereof being shown in heavy, shaded lines.

Figs. 3, 4, and 5 are detail, sectional views taken respectively on the lines 3—3, 4—4, and 5—5 of Fig. 1, and Fig. 6 is an enlarged detail view of an attaching block shown in section in Fig. 2, one of the outer plates secured to said block being removed for clearness in illustration.

Referring to the drawings, particularly Fig. 1, it will be seen that my improved frame is adapted to be connected with the usual front and rear wheels W, the former of which is steered by means of handle bars H, and the front fork F, the latter being rotatably mounted in a steering head 1. The power plant P of this improved machine consists of an internal combustion engine having a pair of horizontally arranged opposed cylinders C, said power plant being hung in the lower portion of the frame in a manner to be hereinafter more particularly set forth.

The steering head 1 forms a portion of a steering head cluster bracket 2 with one part of which the upper reach bar 3 of the frame is connected, another part of the cluster having a rearwardly inclined head bar 4 fixed therein. The reach bar 3 and the head bar 4, as well as other similar parts of the frame, are preferably formed of the usual tubing and are connected together, or to the clusters, by means of welding or the like.

The rear end of the upper reach bar 3 is secured in a seat mast cluster bracket 5 to which is, also, connected a seat mast 6, the latter extending downwardly and forwardly toward the head bar 4 from the free end of which it is spaced a considerable distance, as shown in Fig. 1. The usual rearwardly and downwardly inclined rear fork 7 is pivoted, or otherwise connected, to the cluster bracket 5 and is adapted to straddle the rear wheel W, the axle 8 thereof being held in the axle plates 9 carried by the free ends of the bars of said fork. The head bar 4 and the seat mast 6 are rigidly braced by a horizontally disposed lower reach bar 10, the ends of which are connected to the first mentioned members intermediate their ends. The space between the upper and lower reach bars is designed to be filled by the usual oil and gasolene tank T.

The upper rear fork 7 in the present machine is braced by the lower rear fork 11 formed of a pair of tubular bars 12, the rear ends of which are attached to the axle plates 9, while the forward ends are connected with an attaching block 13, which is carried on the lower free end of the seat mast 6. Particularly from Figs. 2 and 6, it will be seen that this attaching block 13 consists of a casting having a substantially rectangular portion 14 having a centrally apertured opening to receive the seat mast 6, and the rearwardly extending horizontally disposed ribbed plate 15. The rear end of the plate 15 has a pair of studs 16 formed integrally therewith, which are adapted to extend into the tubular bars 12 and be secured thereto by brazing or welding. Said plate 15 is adapted to support the other elements of the motorcycle, which form no part of the present invention.

The lower free end of the head bar 4 also has an attaching member 17 secured thereto, this member being substantially right angular, as shown in Fig. 1. It is secured to the head bar by forming a socket adjacent the intersection of its arms and extending the end of the bar thereinto, the joint thus formed being rendered rigid by welding or brazing.

One of the arms of the member 17 has its opposite sides flattened to provide seats against which plates 18 rest, said plates being secured in position by bolts 19, which extend therethrough and through said frame. These plates 18 coöperate with similar, substantially triangular, plates 20 attached to the rectangular portion 14 of the block 13, the attachment being, also, carried out by means of bolts 21, the object of said plates being to secure the power plant P to the frame. The crank casing and transmission gear casing, in the present power plant, are formed as one element located between the cylinders C, and the distance between the free end of the head bar and the similar end of the seat mast is such as to readily allow these parts to be positioned therebetween. The combined crank and transmission gear casing has a single ear 22 formed on its front wall and a pair of vertically spaced ears 23 projecting from its rear wall, the first named ear being secured between the plates 18 by a bolt 24, while the ears 23 are positioned between the plates 20 and secured thereto by bolts 25. It is obvious that by such a means the power plant may readily be hung in the correct position on the vehicle frame without the usual suspending arrangement and thereby considerably reduce the weight of the machine without decreasing its strength and efficiency.

As will be seen from Fig. 1 the engine cylinders C of the improved power plant are preferably two in number and opposed, each of the same being extended in opposite directions from the opposite walls of the crank case. Said cylinders project from the crank case immediately below the lower ends of the head bar and seat-mast and extend longitudinally of the cycle frame. In view of this arrangement the magneto, transmission gearing and other parts of the power plant will occupy the position assumed by the cylinders of the usual up-right power plant. Furthermore the cylinders in the present machine being positioned longitudinally will not interfere with the foot boards B.

In order that the ordinary foot boards B may be hung on each side of the power plant, an inverted T-shaped bracket 26 is provided, the shank of such bracket being clamped in the arm 17' of the attaching member 17 by the arrangement shown in Fig. 5. The bracket 26 is thus disposed centrally of the vehicle frame and immediately in advance of the forward cylinder of the power plant and its arms 27 project transversely so that the foot boards may be mounted on each side of the forward engine cylinder. The rear ends of the foot boards are supported directly from the crank casing of the power plant by means of the ears 28, as shown. The bracket 26, although it may be formed of tubing, is preferably stamped from a single piece of sheet metal bent, as indicated in Fig. 3.

From the foregoing description taken in connection with the accompanying drawings, it will be evident that a very simply constructed motorcycle frame and engine suspension means has been produced, which will be very efficient in operation and which will be a considerable improvement over the similar devices at present in use. Various minor changes may be made in the form and proportion of the several parts to permit them to be used in connection with motorcycles of various sizes and power.

I claim:—

1. A vehicle of the class described comprising in combination, a cycle frame including a head bar and seat-mast, their lower ends being spaced apart and provided with attaching means, an engine casing disposed between said ends and having attaching means coöperating with the first mentioned attaching means, and a pair of opposed engine cylinders extending in opposite directions from said casing beneath the ends of said head bar and seat-mast, said cylinders being positioned longitudinally of the frame.

2. A vehicle of the class described comprising in combination, a cycle frame including a head bar and seat-mast, their lower ends being spaced apart to form a pair of engine hanger elements, a right-angular attaching member secured adjacent the intersection of its arms to one of said hanger elements, an engine disposed between said hanger elements and secured to one of the same and one arm of the right-angular attaching member, a bracket extending from the other arm of said member, and a foot support secured to the bracket and the engine.

3. A vehicle of the class described comprising in combination, a cycle frame including a head bar and seat-mast, their lower ends being spaced apart to form a pair of engine hanger elements, a right-angular attaching member secured adjacent the intersection of its arms to one of said hanger elements, an engine disposed between said hanger elements and secured to one of the same and one arm of the right-angular attaching member, an inverted T-shaped bracket having its shank secured to the other arm of said member, and a pair of foot supports, one being secured to each arm of said inverted T-shaped bracket and to the engine.

4. The combination with a vehicle frame of the class described comprising a reach bar, a seat mast secured at the rear end of the bar, a head bar fixed at the forward end of the reach bar, said seat mast and head bar being inclined inwardly toward each other to dispose their free ends adjacent each other, a power plant disposed between the free ends of the head bar and seat mast, means for attaching said power plant to said free ends, an inverted, T-shaped hanger bracket, means for securing the shank of said bracket to the head bar adjacent its free end, ears on the power plant, and supports suspended on each side of the power plant from the arms of said T-shaped hanger bracket and said ears.

5. A vehicle of the class described comprising a cycle frame including a downwardly extending bar, an inverted T-shaped bracket, means for securing the shank of the bracket to said bar, the arms of said bracket being disposed transversely of the frame, and a pair of foot supports, one being attached to each arm of the bracket.

In testimony that I claim the foregoing I have hereunto set my hand at Milwaukee, in the county of Milwaukee and State of Wisconsin.

WILLIAM S. HARLEY.